Figure 3:
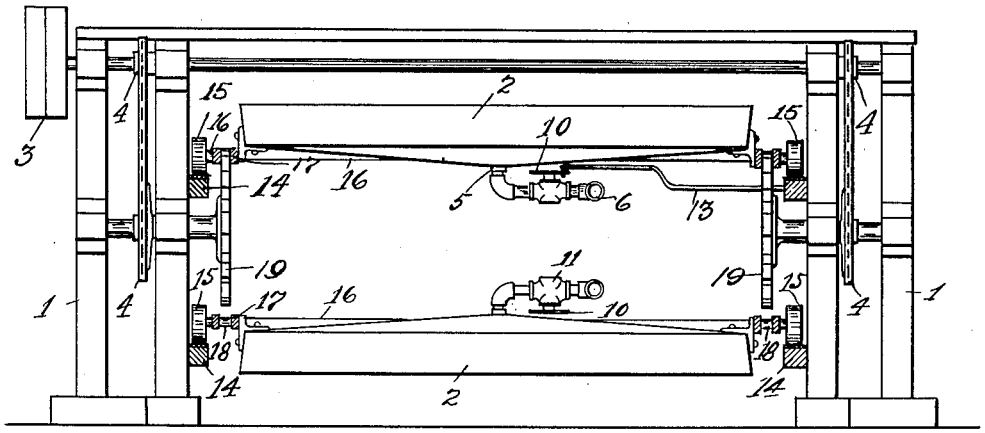

E. P. LYNCH.
APPARATUS FOR EXTRACTING LIQUIDS FROM ORES OR OTHER SUBSTANCES.
APPLICATION FILED OCT. 23, 1905.
910,075.
Patented Jan. 19, 1909.
4 SHEETS—SHEET 1.
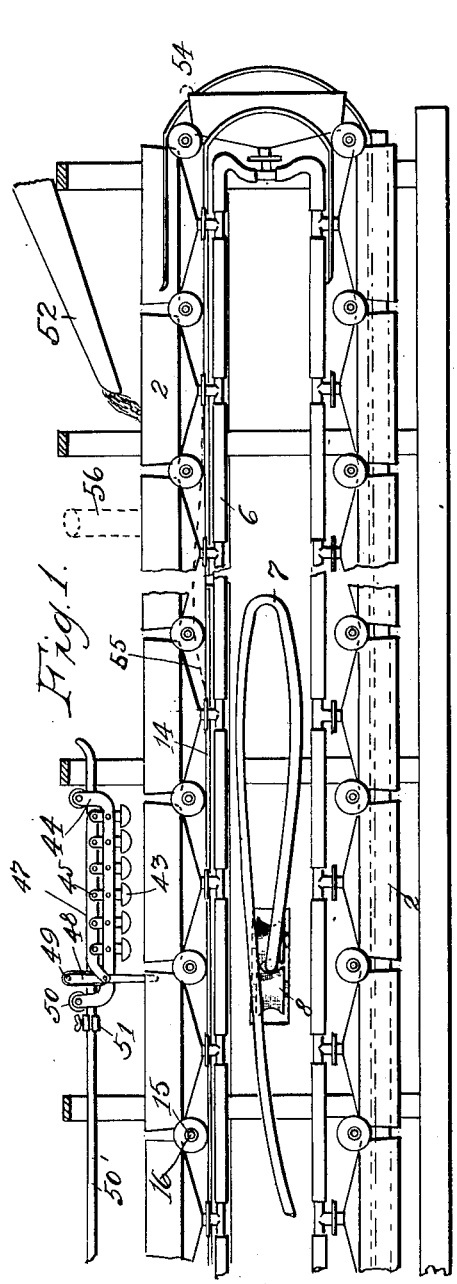
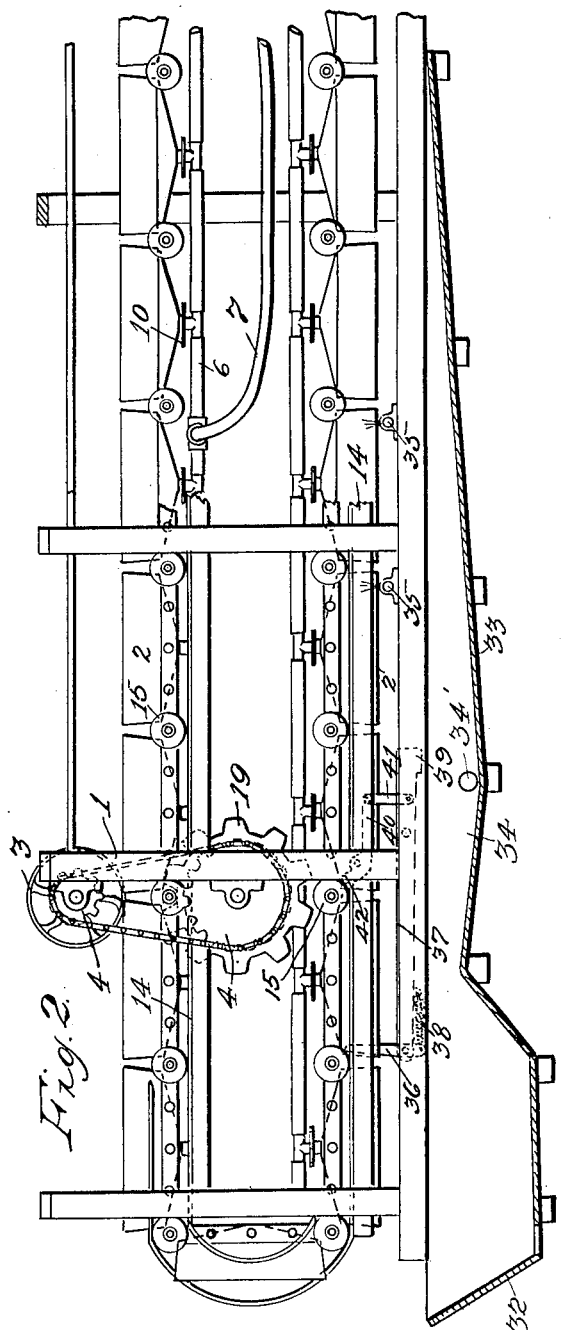
WITNESSES:
INVENTOR.
E. P. Lynch
BY Spear & Seely
ATTORNEYS.

E. P. LYNCH.
APPARATUS FOR EXTRACTING LIQUIDS FROM ORES OR OTHER SUBSTANCES.
APPLICATION FILED OCT. 23, 1905.

910,075.

Patented Jan. 19, 1909.
4 SHEETS—SHEET 2.

WITNESSES:
Dear +
Thune Larsen.
W. S. Boyd.

INVENTOR.
E. P. Lynch
BY Spear & Seely
ATTORNEYS.

E. P. LYNCH.
APPARATUS FOR EXTRACTING LIQUIDS FROM ORES OR OTHER SUBSTANCES.
APPLICATION FILED OCT. 23, 1905.
910,075.
Patented Jan. 19, 1909.
4 SHEETS—SHEET 3.
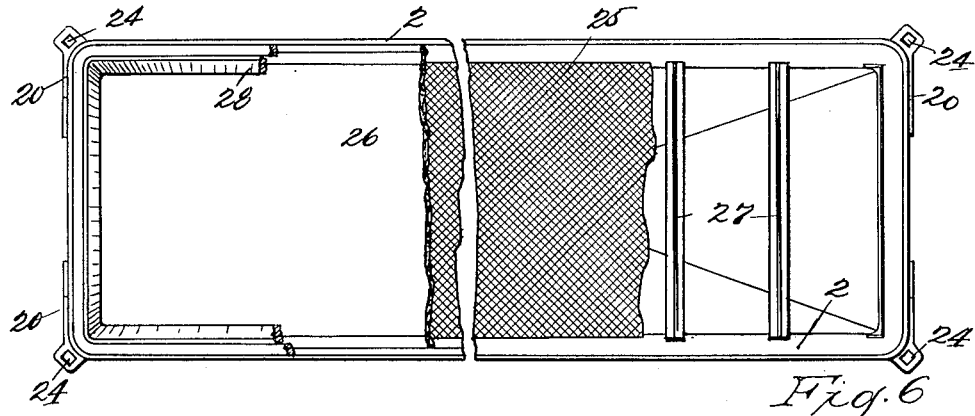
Fig. 6.
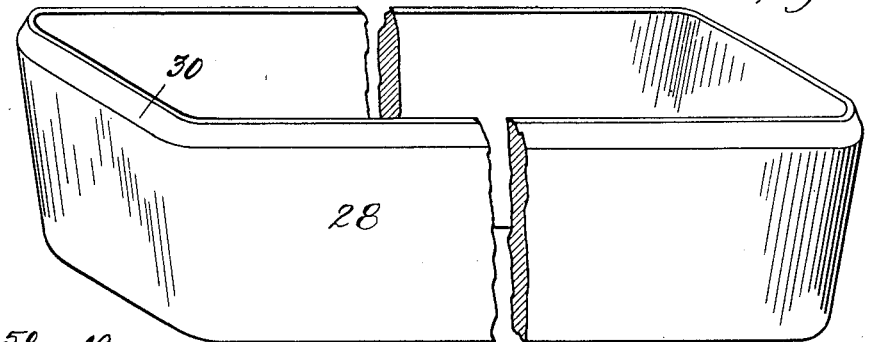
Fig. 7.
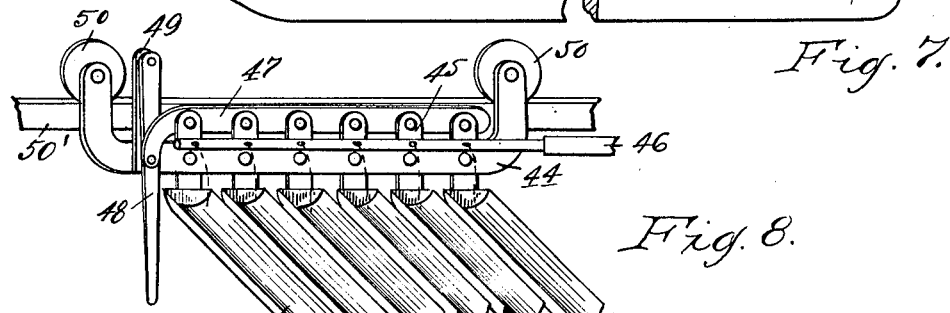
Fig. 8.
WITNESSES:
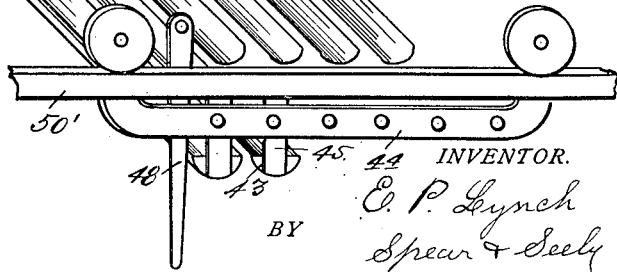
INVENTOR.
E. P. Lynch
BY Spear & Seely
ATTORNEYS.

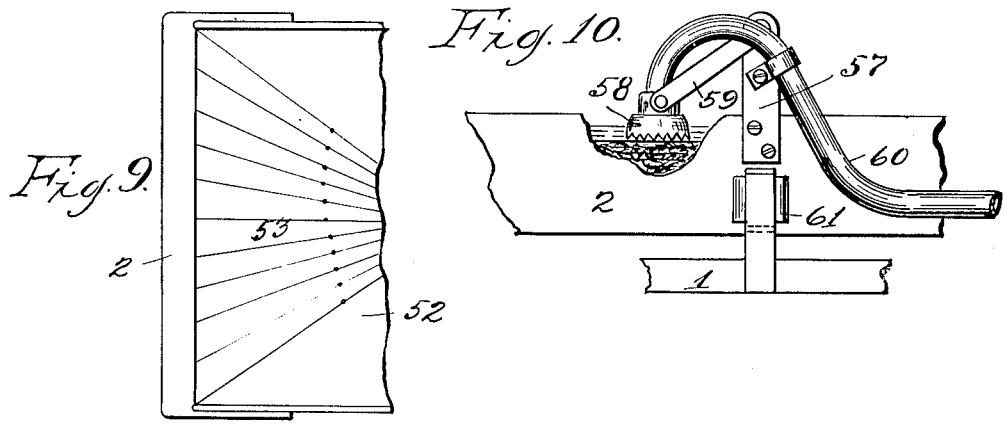
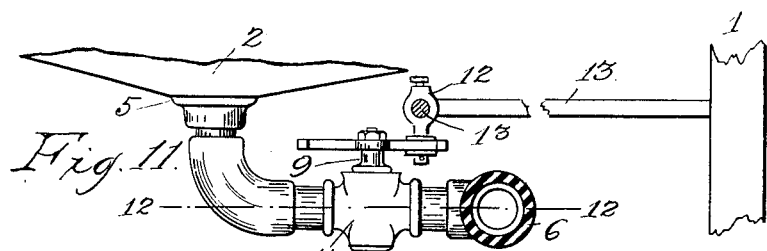
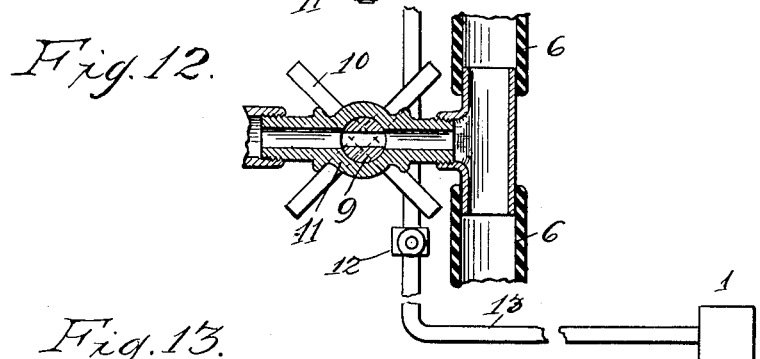
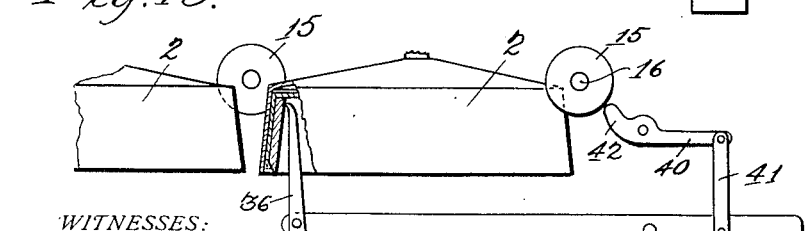

UNITED STATES PATENT OFFICE.

EDWARD P. LYNCH, OF SALT LAKE CITY, UTAH.

APPARATUS FOR EXTRACTING LIQUIDS FROM ORES OR OTHER SUBSTANCES.

No. 910,075.     Specification of Letters Patent.     Patented Jan. 19, 1909.

Application filed October 23, 1905. Serial No. 284,076.

*To all whom it may concern:*

Be it known that I, EDWARD P. LYNCH, citizen of the United States, residing at Salt Lake City, in the county of Salt Lake and State of Utah, have invented certain new and useful Improvements in Apparatus for Extracting Liquids from Ores or other Substances, of which the following is a specification.

My invention relates primarily to improved machinery with which ores which have been crushed and treated with cyanid or other solvents, by agitation or other means, until the values have been practically taken up, can be rapidly and continuously separated from the solvents and washed. The method most generally used heretofore is by percolation in which large quantities of crushed ore are placed in tanks and the solvent allowed to work its way through the mass until such portion of the value as can be secured without a too great loss of time is drawn from the tanks. But in view of the great differences in the character of the ores found even in a single mine, and the unavoidable expense and delay in practicing such a method, there is necessarily a compromise of the various difficulties.

While it is known that fine grinding is necessary to secure the greatest amount of values, it increases the amount of slimes to such an extent that where percolation is used coarse crushing to the extent of using a ⅜ mesh screen has been found necessary. But with such coarse pulp many days time are needed to make even a 70 per cent. extraction of the values as the coarser part of the ore will retain its values intact. There is also danger that with large bodies of fine and coarse ore channels may form through which much of the solvent will pass too freely to do much good at such points and will drain it from the other portions before the values are fully extracted therefrom. To avoid this difficulty and also to permit of as fine grinding as possible the finer part has been separated from the coarser particles and treated by agitation and frequent washings and decantations, or by passing them through a filter press, while the coarser ore has been treated by percolation. But this method has required so much tedious manipulation and a consequent large need of labor that it has never been generally adopted.

The object of my invention is to avoid the difficulties and objections of the former methods and to make it possible, after the ore has been crushed and treated, say within a few hours, to have practically a constant stream of tailings passing from the mill with the values extracted therefrom and with an amount of labor so small as to be almost inappreciable, and of detail so simple as to be very desirable.

Apparatus by which I practice my invention, comprises a construction which is the equivalent of, and may be likened to a number of trays arranged in an endless series and adapted to hold a comparatively shallow layer or portion of ore and solution. While the size and shape of the tray or receptacle and the quantities of pulp treated, and some of the features of construction of the receptacle may be varied according to the extent of the operations, the character of the ore, and the ideas of the different builders or users, the essential features are a series of vessels of some depth with a filtering medium or material firmly supported at such a distance from the bottom as to form a space at the bottom of the vessel to act as a suction or vacuum chamber when the filter is covered with pulp. Means are provided, as a pump, for creating a suction in this chamber to remove the air therefrom and also to handle the solution that may pass to the chamber. To secure the best results it is essential to so secure the filtering material as to assist in forming the vacuum chamber, and when the pulp is spread over said material, that at no place will there be any admission of air that would seriously affect the desired vacuum. The importance of this will be apparent when it is considered that, in practice, if an ore, by fine crushing, would be 50 per cent slime, one inch in depth of pulp with its attendant solution of one and a half, to two or even three volumes to one of ore, would only make a depth of from three to five inches, and with a vacuum of from ten to fifteen pounds to the square inch, the ordinary construction of filters and tanks would in no wise meet the needs.

My apparatus also includes means for extracting liquid from above simultaneously with its extraction from below. When the material to be treated contains a large percentage of slimes which over-lie the coarse material which has settled by gravity to the bottom, the action of the suction from below becomes slower as it progresses on account of the tendency of the slimes to pack or concentrate and so to become more or less impervious to the clear solution above them. While the operation by suction from below is in progress and the coarse material and slimes have settled to the bottom, the clear solution above or a considerable part of it can be drawn off at the top without in any way interfering with or affecting the extraction by suction from below.

The pulp or ore and its solution can be fed to, or deposited in the vessels or receptacles in any desired manner, as by using stationary receptacles and a movable distributer or, as I prefer, by having the distributer stationary and passing a series of receptacles or trays adjacent thereto, as underneath a flat chute or spout. As soon as the pulp has been deposited in a receptacle, suction is established in the vacuum chamber and continued until the solution with its values has been taken from the pulp and the ore washed by depositing on top thereof after the solution has been extracted, sufficient water to replace the small amount of solution, which still adheres to the ore as moisture, and which water is drawn down through the ore by the suction from the bottom of the receptacle and is carried away by the tailings when the receptacles are emptied, as by inverting them.

As the capacity of the machine depends on the number and size of the trays, and speed of travel, etc., a preliminary test of the ore to be worked will establish the size of a machine to handle any given tonnage, and the amount of labor needed for its care should not exceed that needed in caring for a concentrating table.

Figure 4:
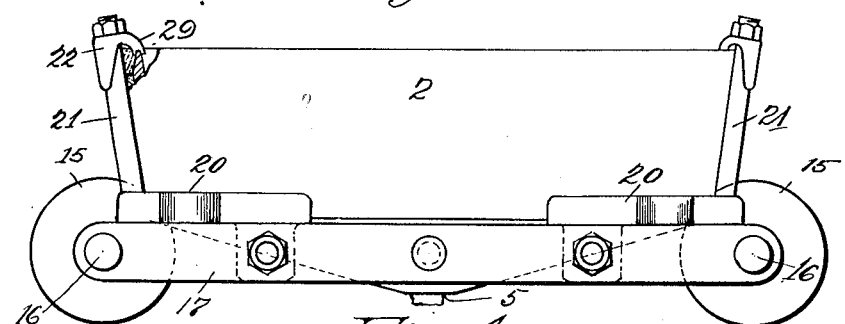
Figure 5:
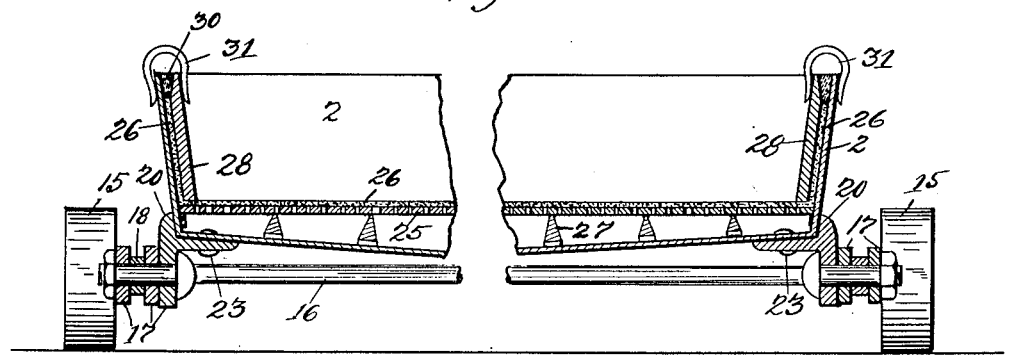

Figures 1 and 2 is a broken side elevation of one form of machine. Fig. 3 is a transverse sectional view of the same. Fig. 4 is an enlarged end view of one of the trays for conveying the ore. Fig. 5 is a longitudinal central section of the same. Fig. 6 is a broken plan view of the tray. Fig. 7 is a perspective view of the follower. Fig. 8 is a broken plan of the water supply. Fig. 9 is a broken plan view of the feed spout. Fig. 10 is a broken side elevation of the siphon arrangement. Fig. 11 is a detail view of the valve. Fig. 12 is a cross section of the same showing spider. Fig. 13 is a detail elevation of the scraper mechanism.

In constructing a machine embodying my invention and adapted to carrying out my process of treating ores, a frame 1 is provided of any suitable construction upon which a series of connected trays 2, preferably of metal, are adapted to be moved slowly forward in the nature of a traveling belt or conveyer. Power is applied through pulleys 3 and sprocket wheels 4, preferably located at or near one end of the frame 1, the sprocket wheels being preferably arranged in duplicate, that is, with a pair on each side of the frame. Each tray is preferably formed from metal and large enough to hold about 100 pounds when the ore or pulp is spread comparatively thin, say about one inch thick in the tray, the tray being about six feet long and two feet wide. The bottom of the tray is depressed toward the center so as to cause the liquid or solution, after passing through the material, to pass out through an opening 5. A series of short sections or lengths of hose 6 are connected to the different trays by means of a T and an elbow at the bottom of each tray, thereby forming an endless conduit adapted to communicate with each tray. The conduit communicates with a suitable air and solution pump, not shown, through a section of hose 7 which is long enough to extend from either end of the frame to an opening 8, preferably shive lined, at the center of the frame, through which the hose 7 passes in or out as the point at which it is connected with one of the hose sections 6 is carried around with the conveyer. The connection between the hose 7 and the section 6 is preferably by means of an ordinary T and an air tight swivel or union to permit of suction being effected regardless of the position occupied by the joint between the hose and the section. But as it is not desirable to have the suction commence before the trays are filled or continue after they have been emptied, a valve, as a perforated plug 9, is located in the connector at the bottom of the tray, a portion only of which connections are shown in Fig. 1. The movement of the valve is controlled by a lever 10 which is preferably cruciform and secured to the end of the valve that projects from its casing 11, and has its ends adapted to be engaged by two stops, as rollers on brackets 12, each bracket being adjustably secured to a rod or bar 13 at each end of the machine. In this manner the valves are automatically opened or closed at any desired point as the trays move forward, or they may be opened or closed manually by the attendant at other points independently of the rollers.

The trays are supported in their travel upon rails or tracks 14 of the frame 1, by means of wheels or rollers 15, journaled at the ends of rods or pivots 16, which are passed through links 17 that are secured to the ends of the trays. Each link is formed with said pieces between which are arranged cross pieces 18 that are adapted to be engaged by the teeth or sprockets of the wheels 19 mounted on the shaft carrying the wheels 4. The trays are preferably connected with the links by means of clips 20, one at each corner. The clips are preferably made from malleable iron and are held to the trays in any desired manner, as by means of rivets through the bottom, and bolts 21 and washers 22. Each clip is provided with two flanges, one at the side, which extends under the bottom of the tray and is secured thereto as shown at 23, and the other one at the end, which extends out beyond the side of the tray and is provided with a perforation 24 through which is passed the bolt 21.

Fitting within the tray and resting at its edges upon the bottom thereof, is a perforated false bottom 25, preferably woven wire of coarse mesh, upon which is placed filtering material, as a piece of cloth 26. Bars 27 extend across the tray and assist in supporting the bottom 25 and cloth 26 and are preferably secured to the false bottom. The upper edge of the cross pieces are preferably made thin so as to avoid obstructing the perforations as much as possible and the bottoms are notched to permit the passage of the solution down the inclined bottom of the tray. The edges of the filter cloth extend up the sides and ends of the tray and are held in position by a follower 28 which is preferably formed continuous and slightly tapered or flaring to fit in the flaring tray. The follower is forced down into the tray and held there by a nose or projection 29 on the washer 22 which projects over the top of the tray and engages with the follower. The upper edge of the follower is preferably beveled or inclined upon its outer surface, as shown at 30, which, together with the thickness of the cloth, forms a trough-like recess around the top of the tray which is filled with suitable material, as wax or paraffin, to form a seal and prevent the entrance of air, pulp or solution between the tray and the follower. Spring clips 31 may be arranged at suitable points along the top of the tray to keep the follower from bulging inward.

Where it is not possible to remove the tailings by sluicing or by an elevator, a bin 32 is provided which is located at the end of the conveyer so as to catch the tailings as they are discharged from the trays as they are inverted, as shown in Fig. 1. An inclined trough or chute 33 extends along under the conveyer to catch surplus wash water or any valuable material, either liquid or solid, and lead it down into a depression 34, from which it may be drawn through an opening 34'. Sprays or jets of water may be projected up into the bottoms of the inverted trays from one or more perforated pipes 35. The pipe or pipes 35 extend across the line of travel of the trays, so that as the inverted trays pass above, the water will be directed in jets against every part of the surface and any thin coating of slime upon the surface as well as any retained in the interstices of the cloth will be directly reached by the water and washed away. The tenacity and adhesiveness of the slimes make it difficult to clean the filter cloth, but by using jets of water in the manner described such cleaning can be done satisfactorily.

A scraper or cleaner 36 is preferably provided over the bin 32 which is adapted to be automatically moved into and out of engagement with the bottom of each of the trays and scrape off any material that does not drop out with the remainder of the material. The scraper consists of a flat blade which is long enough to reach from one end of the tray to the other and is pivotally secured to the end of the lever 37 which is mounted on the frame at the side of the conveyer. A spring 38 holds the blade substantially at right angles to the lever and at the same time permits of its free edge having a sufficient movement to not be broken should it accidentally engage with the edge of the tray or be caught by the bottom. The opposite end of the lever is counter balanced, preferably by means of a weight 39, and is connected with a trip lever 40 by means of a link 41. The free end of the lever 40 passes up through the lower track and is preferably bent upward as shown at 42, and rounded, so that when it is engaged by the wheels 15, it will be forced downward and the weighted end of the lever 37 will be raised sufficiently to lower the operating edge of the scraper below the level of the tops of the inverted trays.

As a slight amount of the solution and its contained values, will stick to the ore as moisture and cannot be removed by suction, it is desirable that water be applied to the top of the ore which will then be drawn down through the ore and thereby wash off and take the place of the solution which solution, as soon as it is released, is drawn off through the exhaust pipe or conduit. The amount of wash water should barely exceed the solution which it is to replace, say about 20 per cent. of the weight of the ore, and it can be applied through a perforated pipe, or when it is desired to apply the water over the entire surface practically at once, it can be done by means of a series of trough like pans 43 which are pivotally supported in side bars 44 by means of arms 45, and are adapted to be filled from any source of supply 46. The upper ends of the arms 45 are connected with a link 47, which is pivotally connected at its forward end with a trip lever 48, which lever is pivotally secured at its upper end to an arm 49, and has its lower end in position to be engaged by the edges of the trays as they pass under the apparatus. The side pieces 44 are preferably provided with wheels 50, by means of which the apparatus may be easily moved upon the track 50, and located so as to discharge the water at any desired point to secure the best results.

The track is secured to the frame 1 and extends from near the discharging end of the conveyer towards the charging or filling end, and the apparatus is locked at any point on the track by means of the clamp 51. After the pans have been tipped by the engagement of the lever 48 with the side of the tray so as to discharge their contents upon the pulp beneath, they are returned to their normal position by gravity as soon as the lever is disengaged from the side of the trough. The flow of water into the pans is so regulated by any suitable means as to just put the desired amount into them during the passage of one tray underneath them.

In operating the herein described mechanism for carrying out my process, the conveyer is driven at such a rate of speed and the feed so regulated that, by the time a tray has been moved, (for illustration, two feet) or the distance of its width, under the feed spout or apron 52, it will have received substantially 100 pounds of ore with the attendant solution, which, in volume may be from one to three times the volume of the ore, as best results may determine. The nature of the ore and amount of solution will determine the rate of travel which will generally be at a speed that will cause each tray to make a complete circuit in from one to two and a half times an hour. The feed spout is preferably of substantially the same width as the length of the trays and has its upper surface provided with spreaders as, grooves or recesses 53, to distribute the pulp evenly to all parts of the tray. In feeding the pulp to the trays it can be arranged, if desired, to first separate by means of a suitably arranged feeder, the granular material from the slime, feeding the coarse material first, and upon it feeding the slimes. After each tray is filled and passes from under the feed spout an empty tray is brought under the spout, and the connection between the filled tray and the suction pipe is opened by any suitable means, preferably the lever 10 as heretofore described, and the solution is drawn off and the values recovered by well known method. By the time the tray reaches the wash water apparatus, which is located to suit the particular ore being treated, the solution has been substantially all removed except that which remains in the ore as moisture and which is washed down and removed by the suction and its place taken by the wash water. After the solution has been removed in this manner, the valve is automatically closed by the lever 10 and the tray is gradually inverted and the material removed by gravity and by the scraper, and then by the jets of water from the pipes 35 arranged transversely of the conveyer and adjacent to the scraper. As an additional means of cleaning the trays, or as a substitute for the jets of water from the pipes 35 the lower or return track may be depressed so that the emptied trays will be carried through or submerged in tanks filled with water and arranged under the frame of the machine. And if desired, slight elevations along this portion of the track could be arranged to give the trays an up and down movement while passing through the tanks and thereby the more thoroughly cleanse them.

The range or capacity of the machine can be varied by varying the number and length of the trays, or by changing the speed or rate of travel of the conveyer, or by varying the amount of material being acted upon, depending on the rapidity with which the solvent can be removed from the pulp. And the form and arrangement of the trays can be changed or varied from being stationary with a movable feed to being moved forward in a straight away method, or even circular or rotary with a stationary feed. But in all cases a series of trays successively receive charges of pulp and the operation of suction is continuous, and by drawing the solution through a thin layer of finely ground and evenly distributed ore, an almost perfect extraction of the values is effected and at a great saving in the time and cost of treatment.

While I show and describe what I consider the best form of constructing a machine for practicing my continuous vacuum process upon a thin layer of pulp, I reserve the right to use such other means and appliances as will come within the scope of my invention. For instance, an oscillating cut out may be provided to direct the stream of pulp from a filled tray to the next one, and especially where the trays are stationary, a bridge piece may be secured to each tray to extend over the edge of the adjoining tray, as shown in dotted lines at 54 in Fig. 1.

Instead of removing all of the solution from the bottom of the tray, a portion of it can be removed from the top by slowly tilting one end of each tray to a slight extent as soon as the slimes have settled, (which may be hastened by the addition of lime), as by means of an elevation in the track on one side, say half an inch, as shown in dotted lines at 55 in Fig. 1, which will cause the solution on top to run to the lower end of the tray from which it may be removed by any ordinary means, as a suction pipe shown in dotted lines at 56 in Fig. 1 and which pipe may be lowered automatically or otherwise, to enter the liquid. In Fig. 10 I have shown a form of siphon which can be used in place of the pipe 56 for the same purpose and in which 57 is a standard that is clamped or otherwise secured to one end of the tray. An inverted cup-shaped head 58 is pivotally connected with the standard by means of an arm 59, and a section of hose or tubing 60 is connected with the head at one end and has its free end extended along the end of the tray where it is adapted to be compressed by a yielding roller 61 as the tray is moved forward. The compression of the tube in this manner will cause a vacuum therein which will cause the liquid in the trays to pass through the head and flow through the tube as through a siphon, whereby all of the clear liquid on top of the ore and slimes may be removed as the edge of the head is notched or serrated to let the liquid enter even after the head rests on the ore. This operation of removing clear solution from above by decantation is important and valuable in connection with the lower suction apparatus, in cases where the ore contains a large percentage of slimes. In cases where the ore is so free and granular that the solution passes through it easily, the bottom suction acts with sufficient rapidity and an upper decantation apparatus need not be used.

While my mechanism is arranged to obtain values from ores, it can be used to take from substances any superabundance of liquid or water. And in the case of mill tailings, taken from them after they leave the battery, the surplus water having the tailings ready for agitation in cyanid solution.

Having described my invention what I claim as new and desire to secure by Letters Patent, is;

1. In a machine of the class described, an endless conveyer, consisting of a series of connected trays, each provided with a perforated false bottom, a layer of filter cloth thereon means for holding the edges of the cloth against the sides and ends of the trays, means for supplying each tray with a layer of pulp so that the coarser portion and slimes will be uniformly distributed over the filter cloth, means for applying a suction below said bottoms to assist in removing the liquid from the solid portions of the pulp through the cloth, means for applying water during one portion of the tray's travel to assist in removing the solution that would remain as moisture in the pulp and means for applying water at another portion of the tray's travel uniformly over the entire surface of the filter for the purpose of cleaning it.

2. In a machine of the class described, an endless conveyer consisting of a series of connected trays, each provided with a suction chamber, suction means connected with said chambers, means at one point for providing each tray with a thin layer of pulp, means at another point for discharging the solid portions thereof, a track, a frame adjustably mounted thereon between said points and provided with a plurality of pivoted pans, means for providing the pans with water, and an arm connected with the pans and adapted to be engaged by said trays for tipping the pans and discharging their contents upon the contents of the trays.

3. In a machine of the class described, an endless conveyer consisting of a series of flexible connected trays, means for providing each tray with a thin layer of pulp, means for removing the liquid portion thereof by suction, means for inverting said trays to remove the solid portion, and a scraper adapted to engage with the bottoms of the inverted trays.

4. In a machine of the class described, an endless conveyer consisting of a series of connected trays, means for providing each tray with a thin layer of pulp, means for removing the liquid portion thereof by suction, means for inverting the trays to remove the solid portion, two levers pivotally mounted below the inverted trays, a scraper blade yieldingly secured to one end of one of the levers and a weight upon the other, a link for connecting said levers, and means upon the conveyer for engaging with the free end of the second mentioned lever and actuating both levers to move said scraper into and out of engagement with the bottoms of the respective trays.

5. In a machine of the class described, a frame provided with a track, a series of trays thereon, each provided with a filter cloth and a suction chamber, a link secured to the end of each tray, a rod for connecting the links of the adjacent trays, a wheel on each end of each rod for engaging with the track and supporting the trays, means for engaging with the links to drive the trays forward, suction means connected with said chambers, means for providing each of said trays with a thin layer of pulp, means for inverting the trays, means for cleaning each tray after it has been inverted, and means adapted to be engaged by said wheels for actuating said cleaning means.

6. In a machine of the class described, a frame provided with a track, a series of trays thereon, each provided with a suction chamber, a filter cloth in each tray, a follower for holding said cloth in position, a perforated clip at each corner of each tray provided with a flange, a bolt through each perforation, a washer on the bolt adapted to hold the follower in position, a sprocket link secured to the flanges at each end of each tray, rods for connecting the ends of adjacent links, a wheel on each end of each rod adapted to engage with the tracks for supporting the trays, and sprocket wheels for engaging with said links to drive the trays forward.

7. In a machine of the class described, a tray having a false bottom pervious to liquid by which it is divided into two compartments, suction means for extracting liquid through said false bottom from below, and means for simultaneously extracting liquid from above.

8. In a machine of the class described, a series of traveling trays, each having a false bottom pervious to liquid by which it is divided into two compartments, suction means for extracting liquid through said false bottom from below, and separate means for extracting liquid from above.

9. In an apparatus of the class described, a connected series of traveling trays each having a false bottom pervious to liquid, suction means for extracting liquid through said false bottom from below, and a suction pipe entering the upper compartment of the trays from above for withdrawing liquid upwardly from said upper compartment.

10. In an apparatus of the class described, a traveling tray having a false bottom pervious to liquid, suctions means for extracting liquid through said false bottom from below, a flexible pipe entering said tray from above, and means for compressing said pipe so as to expel air therefrom, and thereby extract liquid through said pipe from above.

In testimony whereof I affix my signature, in presence of two witnesses, this 30th day of September, 1905.

EDWARD P. LYNCH.

Witnesses:
    JOSEPH SMITH,
    E. V. HIGGINS.